Patented Feb. 2, 1943

2,309,663

UNITED STATES PATENT OFFICE 2,309,663

PROCESS FOR PREPARING SUBSTITUTED GUANAMINES

Wilbur Null Oldham, Old Greenwich, Conn., assignor to American Cyanamid Company, New York, N. Y., a corporation of Maine No Drawing. Application August 30, 1941, Serial No. 409,138

10 Claims. (Cl. 260—248)

This invention relates to a method of preparing guanamines in which at least one of the amino groups of the guanamine ring is a cyclic amine.

In the past certain guanamines have been prepared by the reaction of esters of certain simple acids such as formic acid with the corresponding biguanide. When, however, it is attempted to produce a substituted guanamine in which one or both of the amino groups are cyclic amines, the reaction does not proceed with a satisfactory speed and in acceptable yields except with formic esters.

According to the present invention, I have found that if the reaction is carried out in the presence of a metal alkoxide, the reaction proceeds smoothly, rapidly, and greatly improved yields are obtained. The cyclic amino group in the molecule may be a secondary or tertiary amine. In the latter case, it may form a part of the cyclic ring. Examples of such guanamines are 4-N-phenyl, tolyl, hydroxyphenyl, nitrophenyl, aminophenyl, hydroxybiphenyl, morpholino, and the like.

Without wishing to limit the mechanism of the reaction to any particular theory, it is my belief that the metal alkoxide takes part in the reaction as a reactant. It is certainly not a catalyst in the ordinary sense of the word because when the amounts of alkoxide are increased up to approximately stoichiometrical equivalency with the substituted biguanide and ester, yields and speed of reaction increase. The amount of alkoxide, however, is not critical and in many cases it is possible to obtain satisfactory results with somewhat less than stoichiometrical equivalents of the alkoxide. The particular metal alkoxide used is not of vital importance, substantially the same results being obtained with sodium and potassium oxide, ethoxide, aluminum isopropoxide, and the like. For practical purposes, however, it is preferable to use the sodium alkoxides because of the lower cost.

The invention will be described in greater detail in conjunction with the following examples, which are representative of typical guanamines that can be prepared in accordance with the present invention. The parts are by weight.

*Example 1*

4-N-phenyl acetoguanamine

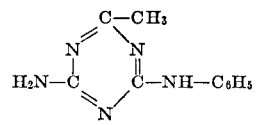

7 parts of sodium were dissolved in 450 parts of ethanol. 55 parts of phenyl biguanide and 90 parts of ethyl acetate were then added and the mixture allowed to stand. Precipitation of the guanamine began in ten minutes and was complete in 24 hours producing 4-N-phenyl acetoguanamine having a melting point of 178° C. in 61% yield.

When the same reaction was carried out without any sodium the yield was only 40% even after refluxing for 15 hours.

*Example 2*

4-N-phenyl butyroguanamine

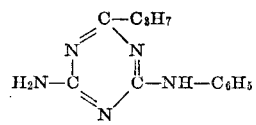

879 parts of phenyl biguanide were dissolved in a mixture of 2900 parts of methanol and 114 parts of sodium as the alkoxide, and 1050 parts of ethyl butyrate were added. After standing overnight the guanamine precipitated, was crystallized from toluene, and washed giving a product having a melting point of 155–156° C. The yield of the 4-N-phenyl butyroguanamine was about 60%.

*Example 3*

4-N-phenyl-β-methoxypropionoguanamine

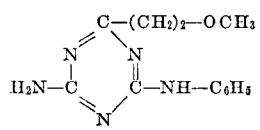

70.8 parts of phenyl biguanide were dissolved in 160 parts of methanol containing 9.2 parts of sodium, and 88.5 parts of beta-methoxy propionate were added. After standing for 24 hours the 4-N-phenyl β-methoxypropionoguanamine precipitated and was recrystallized from aqueous ethanol and toluene. A yield of about 39% was obtained of a product having a melting point of 118° C.

Example 4

4-N-phenyl benzoguanamine

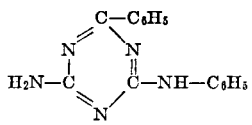

88.5 parts of phenyl biguanide dissolved in 200 parts of methanol containing 11.5 parts of sodium was mixed with 125 parts of methyl benzoate. Precipitation started within 15 minutes and was substantially complete in 24 hours. After recrystallization from toluene, 4-N-phenyl benzoguanamine was obtained having a melting point of 199–201° C., the yield being about 36.7%.

Example 5

4-N-phenyl propionoguanamine

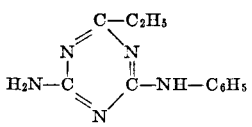

293 parts of phenyl biguanide were dissolved in 640 parts of methanol containing 38 parts of sodium and 306 parts of ethyl propionate were added. After about fifteen hours the 4-N-phenyl propionoguanamine precipitated, was recrystallized from toluene and melted at about 157–158° C. The yield was 68.2%.

Example 6

4-N-morpholino benzoguanamine

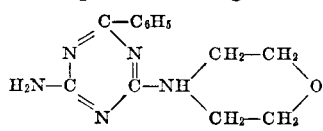

40 parts of N-biguanylmorpholine hydrochloride were mixed with 34 parts of methyl benzoate, using 10.7 parts of sodium in 200 parts of methanol both as a condensing and neutralizing agent. The sodium chloride formed in the neutralization of the N-biguanylmorpholine hydrochloride, is filtered off and the filtrate allowed to stand for about a day. Gradual solidification takes place. The small amount of liquid remaining is filtered off, producing about 56 parts of solid which is slurried with 100 parts of boiling water, then cooled to 20–25° C. and filtered. The product obtained melts at 142–143° C. and analyzes for 4-N-morpholino benzoguanamine.

Example 7

4-N-morpholino hexanoguanamine

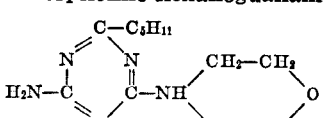

40 parts of N-biguanylmorpholine hydrochloride are dissolved in 200 parts of methanol containing 8.5 parts of sodium. 48 parts of methyl caproate are then introduced, and the sodium chloride formed is filtered off, the filtrate being allowed to stand. Crystals form gradually and are removed by filtration and washed with water. The melting point of the 4-N-morpholino hex- anoguanamine so obtained is 120–123° C. The product is soluble in acetone, insoluble in water and can be recrystallized from a mixture of acetone and water giving a product which melts at 124° C. The yield is in excess of 60%.

Example 8

4-N-p-hydroxyphenyl butyroguanamine

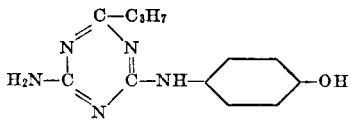

Ninety parts of 1-para-hydroxyphenyl biguanide hydrochloride and 116 parts of ethyl butyrate are added to a solution of 27 parts of sodium in 300 parts of methanol. The sodium chloride formed is removed by filtration and the reaction mixture is allowed to stand. After 24 hours the precipitated guanamine is filtered off and treated with dilute hydrochloric acid and then enough potassium carbonate to make the suspension slightly alkaline. The product can be recrystallized from a mixture of methanol and water or from a mixture of acetone and water. The 4-N-p-hydroxyphenyl butyroguanamine melts at 205–206° C. and is isolated in a yield of about 38%.

Example 9

4-N-m-aminophenyl butyroguanamine

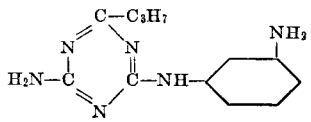

1-m-Aminophenyl biguanide was prepared by refluxing for three hours a mixture of 108 parts of m-phenylenediamine, 97 parts of concentrated hydrochloric acid, 84 parts of dicyandiamide and 300 parts of water. The resulting solution was evaporated to dryness and extracted with ethanol leaving the biguanide hydrochloride. This salt melted at 197° C. with decomposition and was produced in a yield of about 35%.

65 parts of 1-m-aminophenyl biguanide hydrochloride and 66 parts of ethyl butyrate are mixed with 200 parts of methanol containing 13 parts of sodium. After filtering off the sodium chloride formed, the reaction mixture is allowed to stand several days. The precipitated guanamine is then filtered off and recrystallized from ethanol using decolorizing charcoal as a clarifying agent. The 4-N-m-aminophenyl butyroguanamine is isolated in a yield of about 23% and after shrinking at 175° C. melts at 200–205° C with decomposition.

Example 10

4-N-hydroxybiphenyl butyroguanamine

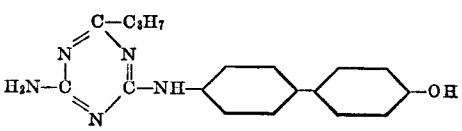

p-Hydroxybiphenyl was nitrated by adding 1:1 nitric acid to a benzene solution of the hydroxy compound, the temperature being kept below 20° C. The nitrated product was not easily steam-distilled and was not purified further before being reduced with excess tin and hydrochloric acid to give an amino hydroxybiphenyl hydrochloride compound melting at 240–245° C.

50 parts of this amino hydroxybiphenyl hydrochloride and 19 parts of dicyandiamide are dissolved in 250 parts of water and the solution refluxed for one-half hour. The biguanide hydrochloride is recovered by cooling the solution and filtering off the precipitated solid. The 1-hydroxybiphenyl biguanide hydrochloride melts at 195–200° C. and is isolated in about a 58% yield.

30 parts of the sodium derivative of this 1-hydroxybiphenyl biguanide and 35 parts of ethyl butyrate are mixed with 175 parts of methanol containing 2.3 parts of sodium. After standing for several days, the 4-N-hydroxybiphenyl butyroguanamine is filtered off and suspended in 500 cc. of alcohol. The suspension is first made acid with hydrochloric acid and then alkaline with ammonium hydroxide. After dilution with 1500 parts of water the guanamine is filtered off and recovered in a yield of about 60%. 4-N-hydroxybiphenyl butyroguanamine can be recrystallized from a mixture of the ethyl ether of ethylene glycol and water and melts at 270° C.

What I claim is:

1. A method of producing a guanamine in which the 4-carbon atom of the triazine ring is attached by a carbon-to-nitrogen bond to the radical of a cyclic amine and the 6-carbon atom of the triazine ring is attached to a radical of the group consisting of amine, alkyl amines and cyclic amines through a carbon-to-nitrogen bond which comprises reacting a correspondingly substituted biguanide with an ester of a carboxylic acid in the presence of an alkali metal alkoxide.

2. A method of preparing a guanamine in which the 4-carbon atom of the triazine ring is attached by a carbon-to-nitrogen bond to the radical of a cyclic amine which comprises reacting the corresponding 1-substituted biguanide with an ester of an organic carboxylic acid in the presence of an alkali metal alkoxide.

3. A method of producing a 4-N-arylguanamine which comprises reacting the corresponding 1-arylbiguanide with an ester of an organic carboxylic acid in the presence of an alkali metal alkoxide.

4. A method of producing a 4-N-phenylguanamine which comprises reacting 1-phenylbiguanide with an ester of an organic carboxylic acid in the presence of an alkali metal alkoxide.

5. A method of producing a 4-N-morpholinoguanamine which comprises reacting 1-biguanylmorpholine with an ester of an organic carboxylic acid in the presence of an alkali metal alkoxide.

6. A method according to claim 1 in which the alkoxide is present in approximately stoichiometrical proportions.

7. A method according to claim 2 in which the alkoxide is present in approximately stoichiometrical proportions.

8. A method according to claim 3 in which the alkoxide is present in approximately stoichiometrical proportions.

9. A method according to claim 4 in which the alkoxide is present in approximately stoichiometrical proportions.

10. A method according to claim 5 in which the alkoxide is present in approximately stoichiometrical proportions.

WILBUR NULL OLDHAM.